(12) United States Patent
Wang et al.

(10) Patent No.: US 12,302,373 B2
(45) Date of Patent: May 13, 2025

(54) WIRELESS COMMUNICATION METHOD, APPARATUS AND SYSTEM

(71) Applicant: Panasonic Intellectual Property Corporation of America, Torrance, CA (US)

(72) Inventors: Lilei Wang, Beijing (CN); Hidetoshi Suzuki, Kanagawa (JP); Joachim Loehr, Hessen (DE); Sujuan Feng, Hessen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 17/953,201

(22) Filed: Sep. 26, 2022

(65) Prior Publication Data
US 2023/0018107 A1    Jan. 19, 2023

Related U.S. Application Data

(63) Continuation of application No. 16/321,663, filed as application No. PCT/CN2016/094632 on Aug. 11, 2016, now Pat. No. 11,490,394.

(51) Int. Cl.
*H04W 72/54* (2023.01)
*H04W 24/10* (2009.01)
*H04W 72/02* (2009.01)
*H04W 92/18* (2009.01)

(52) U.S. Cl.
CPC ........... *H04W 72/54* (2023.01); *H04W 24/10* (2013.01); *H04W 72/02* (2013.01); *H04W 92/18* (2013.01)

(58) Field of Classification Search
CPC ..... H04W 72/54; H04W 24/10; H04W 72/02; H04W 92/18
See application file for complete search history.

(56) References Cited

U.S. PATENT DOCUMENTS

| 5,265,240 A | 11/1993 | Galbraith et al. |
| 10,447,596 B2 * | 10/2019 | Gulati .................. H04W 72/56 |
| 2008/0192644 A1 | 8/2008 | Utsunomiya et al. |

(Continued)

FOREIGN PATENT DOCUMENTS

| JP | 2015-019230 A | 1/2015 |
| JP | 2016-116173 A | 6/2016 |

(Continued)

OTHER PUBLICATIONS

Alessia Autolitano et al., "Understanding the Channel Busy Ratio Metrics for Decentralized Congestion Control in VANETs", 2014 International Conference on Connected Vehicles and Expo (ICCVE), Dec. 2014.

(Continued)

*Primary Examiner* — Rhonda L Murphy
(74) *Attorney, Agent, or Firm* — Seed IP Law Group LLP

(57) ABSTRACT

There are provided a wireless communication apparatus, method and system. The apparatus, at a first node, comprises: a transceiver, operative to transmit and/or receive radio signal; a circuitry, operative to measure one or more channel busy ratios for channel resource pools of the radio signal, and perform congestion control on the channel resource pools based on the measured channel busy ratios.

11 Claims, 9 Drawing Sheets

(56) References Cited

U.S. PATENT DOCUMENTS

| | | | |
|---|---|---|---|
| 2010/0049819 | A1 | 2/2010 | Hamada et al. |
| 2014/0119210 | A1 | 5/2014 | Bansal et al. |
| 2014/0301237 | A1 | 10/2014 | Yi et al. |
| 2016/0174240 | A1 | 6/2016 | Li |
| 2017/0280469 | A1 | 9/2017 | Park et al. |
| 2017/0318546 | A1 | 11/2017 | Suzuki et al. |
| 2017/0367005 | A1* | 12/2017 | Shi .................. H04W 4/40 |
| 2019/0229964 | A1 | 7/2019 | Ouchi et al. |
| 2020/0221467 | A1* | 7/2020 | Huang ............ H04W 72/542 |
| 2020/0314803 | A1* | 10/2020 | Zhang ............ H04W 72/542 |
| 2021/0289507 | A1 | 9/2021 | Wang et al. |

FOREIGN PATENT DOCUMENTS

| | | |
|---|---|---|
| JP | 2019-528584 A | 10/2019 |
| WO | 2008/099716 A1 | 8/2008 |
| WO | 2015/032045 A1 | 3/2015 |
| WO | 2016/072382 A1 | 5/2016 |
| WO | 2016/085210 A1 | 6/2016 |

OTHER PUBLICATIONS

CATT, Consideration on design for eNB scheduling PC5 V2V [online], 3GPP TSG-RAN WG1 #83 R1-156608, Internet<URL:http://www.3gpp.org/ftp/tsg_ran/WG1_RL1/TSGR1_83/Docs/R1-156608.zip>, Nov. 15-22, 2015, Section2.4.
Communication pursuant to Article 94(3) EPC Jun. 8, 2020 for the related European Patent Application No. 16912255.3.
Communication pursuant to Article 94(3) EPC dated Mar. 12, 2021 for the related European Patent Application No. 16912255.3.
English Translation of Chinese Office Action dated Feb. 8, 2022 for related Chinese Patent Application No. 201680088104.X. (14 pages).
Ericsson: "Congestion Control in V2X Sidelink", 3GPP Draft; R2-164106—Congestion Control in V2X Sidelink, 3rd Generation Partnership Project (3GPP), Mobile Competence Centre ; 650, Route Des Lucioles ; F-06921 Sophia-Antipolis Cedex ; France, vol. RAN WG2, No. Nanjing, China; May 23, 2016-May 27, 2016 May 22, 2016 (May 22, 2016), XP051105423, Retrieved from the Internet: URL:http://www.3gpp.org/ftp/Meetings_3GPP_SYNC/RAN2/Docs/ [retrieved on May 22, 2016].
Ericsson: "Radio measurements for congestion control for V2X", 3GPP Draft; R1-165268 Radio Measurements for Congestion Control for V2X, 3rd Generation Partnership Project (3GPP), Mobile Competence Centre ; 650, Route Des Lucioles ; F-06921 Sophia-Antipolis Cedex, vol. RAN WG1, No. Nanjing; May 23, 2016-May 27, 2016 May 14, 2016 (May 14, 2016), XP051089794, Retrieved from the Internet: URL:http://www.3gpp.org/ftp/tsg_ran/WG1_RL1/TSGR1_85/Docs/ [retrieved on May 14, 2016].
Ericsson: "Radio measurements for congestion control for V2X", 3GPP Draft; R4-164248 Measurements for Congestion Control, 3rd Generation Partnership Project (3GPP), Mobile Competence Centre ; 650, Route Des Lucioles ;F-06921 Sophia-Antipolis Cedex ; France, vol. RAN WG4, No. Nanjing, P.R. China; May 23, 2016-May 27, 2016 May 22, 2016 (May 22, 2016), XP051107107.
Ericsson, Subbands and measurements for sensing for V2V over PC5[online], 3GPP TSG-RAN WG1 #85 R1-165273, Internet<URL:http://www.3gpp.org/ftp/tsg_ran/WG1_RL1/TSGR1_1379/Docs/R1-165273.zip>, May 23-27, 2016, Section3.
The Extended European Search Report dated May 29, 2019 for the related European Patent Application No. 16912255.3.
Extended European Search Report dated Mar. 18, 2022 for related European Patent Application No. 21214754.0. (11 pages).
Guangdong OPPO Mobile Telecom, "UE sensing based congestion control for mode-2", 3GPP TSG RAN WG1 Meeting #85 R1-164467, May 23, 2016. (1 page).
Gaurav Bansal et al., "Comparing LIMERIC and DCC approaches for VANET Channel Congestion Control", IEEE, Dec. 2014.
Huawei et al: "Congestion Control for Uu and PC5 based V2X transmission" 3GPP Draft; R2-163808 Congestion Control for Uu and PC5 Based V2X Transmission, 3rd Generation Partnership Project (3GPP), Mobile Competence Centre ;650, Route Des Lucioles ;F-06921 Sophia-Antipolis, vol. RAN WG2, No. Nanjing, China; May 23, 2016-May 27, 2016 May 22, 2016 (May 22, 2016), XP051105214, Retrieved from the Internet: URL:http://www.3gpp.org/ftp/Meetings_3GPP_SYNC/RAN2/Docs/[retrieved on May 22, 2016].
Huawei, HiSilicon, Resource(re)selection triggering mechanisms[online], 3GPP TSG-RAN WG1 #85 R1-164096, Internet<URL:http://www.3gpp.org/ftp/tsg_ran/WG1_RL1/TSGR1_220/Docs/R1-164096.zip>,May 23-27, 2016, Section2.
International Search Report of PCT application No. PCT/CN2016/094632 dated Apr. 7, 2017.
R Priandono: "Design and evaluation of multi-channel operation implementation of ETSI GeoNetworking Protocol for ITS-G5", Master Thesis, Aug. 1, 2015 (Aug. 1, 2015), XP55558837.
European Communication pursuant to Article 94(3) EPC dated Apr. 25, 2024, for the corresponding European Patent Application No. 21214754.0, 6 pages.
RAN WG1, "LS on RAN1 agreements potentially related to RAN2 in sidelink-based V2V," R1-165965, 3GPP TSG RAN WG1 Meeting #85, Nanjing, China, May 23-27, 2016, 4 pages.

* cited by examiner

Resources at Mode 1

CBR1 ( of SA for mode 1 )

CBR2 ( of data for mode 1 )

CBR3 ( of SA for mode 2 )

CBR4 ( of data for mode 2 )

Resources at Mode 2

CBR is seperately measured between SA and data and between mode 1 and mode 2

WIRELESS COMMUNICATION METHOD, APPARATUS AND SYSTEM

BACKGROUND

1. Technical Field

The present technology relates to wireless communication field, and more particular, to a wireless communication method, apparatus and system.

2. Description of the Related Art

Congestion control function is a mandatory requirement for equipments operated in 5.9 GHz Intelligent Transport System (ITS) band in Europe, and third Generation Partnership Project (3GPP) is going to specify the congestion control function as well based on especially, vehicle to vehicle (V2V) discussion.

SUMMARY

One non-limiting and exemplary embodiment provides a wireless communication method, apparatus and system for congestion control.

In one general aspect, there is provided an apparatus, at a first node, comprising: a transceiver, operative to transmit and/or receive radio signal; a circuitry, operative to measure one or more channel busy ratios for channel resource pools of the radio signal, and perform congestion control on the channel resource pools based on the measured channel busy ratios.

In another general aspect, there is provided a method, at a first node, operative to transmit and/or receive radio signal, the method comprising: measuring one or more channel busy ratios for channel resource pools of the radio signal, and performing congestion control on the channel resource pools based on the measured channel busy ratios.

In another general aspect, there is provided a system, at a first node, comprising: a processor; a memory coupled with the processor, when executed by the processor, to perform a method including: measuring one or more channel busy ratios for channel resource pools of the radio signal, and performing congestion control on the channel resource pools based on the measured channel busy ratios.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Embodiments will now be described with reference to FIGS. 3 through 6, which relate to a communication method, apparatus and system. It is understood that the present technology may be embodied in many different forms and in many different orders and should not be construed as being limited to the embodiments set forth herein. Rather, these embodiments are provided so that this disclosure will be thorough and complete and will fully convey the present technology to those skilled in the art. Indeed, the present technology is intended to cover alternatives, modifications and equivalents of these embodiments, which are included within the scope and spirit of the technology as defined by the appended claims. Furthermore, in the following detailed description of the present technology, numerous specific details are set forth in order to provide a thorough understanding of the present technology. However, it will be clear to those of ordinary skill in the art that the present technology may be practiced without such specific details.

While orders of the steps of the methods and the structures of the components are provided herein for exemplary purposes, but not for limitation. The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

Figure 1:
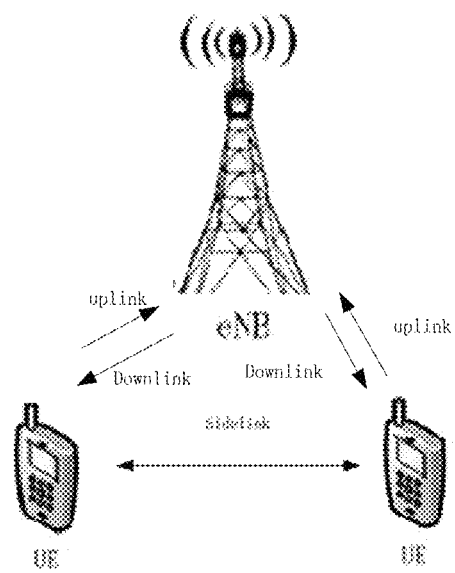
FIG. 1 schematically shows an example of a wireless communication scenario including a user equipment (UE) and a base station such as eNodeB (eNB).

FIG. 1 schematically shows an example of a wireless communication scenario including a user equipment (UE) and a base station such as eNodeB (eNB).

In a wireless communication scenario, when two user equipment (UE) terminals (e.g., mobile communication devices) of a wireless communication network communicate with each other, their data path typically goes through an operator network. The data path through the network may include base stations (such as eNB) and/or gateways. If the devices are in close proximity with each other, their data path may be routed locally through a local base station. The data path from the UE to the eNB is called generally as an uplink channel or uplink (or UL for short), and the data path from the eNB to the UE is called generally as a downlink channel or downlink (or DL for short).

It is also possible for two UE terminals in close proximity to each other to establish a direct link or communication without going through a base station such as eNB. Telecommunications systems may use device-to-device ("D2D") communication or vehicle-to-vehicle ("V2V"), in which two or more UE terminals directly communicate with one another. In the D2D or V2V communication, voice and/or data traffic (referred to herein as "user traffic or user data") from one UE terminal to one or more other UE terminals may not be communicated through a base station or other network control device of a telecommunication system. D2D or V2V communication has more recently also become known as "sidelink direct communication" or even "sidelink" communications, and accordingly is sometimes abbreviated as "SLD" or "SL". As such, D2D or V2V, sidelink direct, and sidelink, or sidelink channel are used interchangeably herein but all have the same meaning.

At present, in order to allocate and manage radio resources for performing the wireless communication, a solution for allocating and recovering radio resources in a Physical Uplink Control Channel (PUCCH) is provided in the related art. Taking the allocation of Scheduling Request (SR) resources in the PUCCH as an example, the solution is as follows: a radio resource manager of a base station generates a resource pool; when a UE accesses a network, the radio resource manager searches the resource pool to allocates a resource being unused to the UE upon finding it, and sets the resource to be in the in-use state; and when the UE releases the resource, the radio resource manager sets the resource to be in the not-in-use state.

However, the above solution for allocating resources stores the in-use resources and the not-in-use resources in a mixed manner in the above solution for allocating resources, and does not distinguish different resource types, so the congestion control is performed with respect to all the resources as an entirety, therefore, an improved solution for better resource allocation and congestion control is required.

Figure 2:
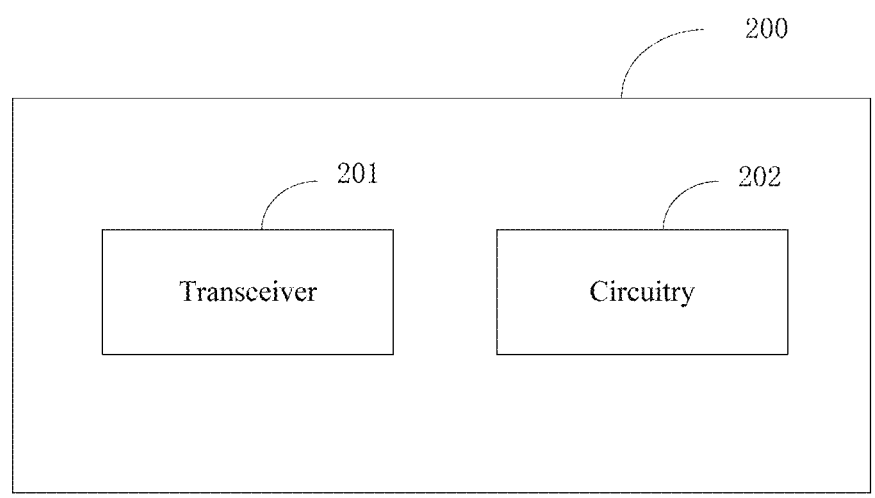
FIG. 2 schematically shows a block diagram of a wireless communication apparatus according to an embodiment of the present disclosure.

FIG. 2 schematically shows a block diagram of a wireless communication apparatus 200 according to an embodiment of the present disclosure.

The wireless communication apparatus 200 at a first node according to the embodiment of the present disclosure includes a transceiver 201, operative to transmit and/or receive radio signal; a circuitry 202, operative to measure one or more channel busy ratios (CBRs) for channel resource pools of the radio signal, and perform congestion control on the channel resource pools based on the measured one or more channel busy ratios.

CBR proposed herein generally means how many resources are occupied to reflect congestion situation in the wireless communication, and it can be observed at both UE side and eNB side. By measuring the CBR, the UE or eNB could take relevant actions for congestion control based on a degree of the CBR. Therefore, the CBR measurement is a basis for congestion control.

This embodiment can measure a CBR of the whole bandwidth including all D2D or V2V resource pools. Then relevant actions can be taken based on the CBR measurement. Thus, congestion situation can be controlled and balanced.

Furthermore, in order to distinguish situations of transmission Mode 1 and transmission Mode 2, or Scheduling Assignment (SA) and data as defined in 3GPP so as to do refined actions, and to know whether SA resource (or generally speaking, control channel resource) pool or data resource (or generally speaking, data channel resource) pool is congested, in an embodiment, the circuitry 202 may be operative to measure channel busy ratios for different types of channel resource pools of the radio signal respectively, and perform congestion control on the different types of channel resource pools based on the measured channel busy ratios.

Thus, in order to obtain improved congestion control result, with the solution according to the embodiment of the disclosure, the circuitry 202 can measure CBRs for different types of channel resource pools of the radio signal respectively, and perform congestion control on the different types of channel resource pools based on the measured channel busy ratios. Thus, each CBR for each type of channel resource pool can be measured separately, and the congestion situation for each type of channel resource pool can be clearly known, and a distinctive and unique congestion control can be performed particularly with respect to this type of channel resource pool. Therefore, such congestion control can be more accurate and efficient.

In this case, firstly, certain resource pool's congestion can be improved separately, in the case that the average congestion for the entire bandwidth may not tell details about different types of resource pools. And secondly, congestion situations can be observed for each type of resource pool, relevant actions can be taken for each type of resource pool. Thirdly, it may save power for measuring all the resource pools each time.

In an embodiment, the CBR can be measured by calculating a ratio of occupied number of resources to a total number of resources. The occupied number of resources indicates a number of calculation units of radio signal which have powers larger than a threshold, and the total number of resources indicates a total number of the calculation units of radio signal.

As an example but not for limitation, the CBR can be measured by the following formula (1)

$$\text{CBR} = \text{occupied number/total number} \qquad \text{formula (1)}$$

The occupied number indicates a number of calculation units of radio signal which have powers larger than a threshold as mentioned above, and the total number indicates a total number of the calculation units of radio signal as mentioned above.

In an embodiment, the calculation units of radio signal may include one or more physical resource blocks (PRBs), or one or more resource block groups (RBGs) or other units for calculating the powers, and the powers may include radio signal power strength, or power spectrum density or others for evaluating the power degree or usage degree.

In an embodiment, the different types of channel resource pools of the radio signal may include a control channel resource pool, and a data channel resource pool, and the circuitry may be operative to measure a first channel busy ratio for the control channel resource pool and measure a second channel busy ratio for the data channel resource pool.

Figure 3A:
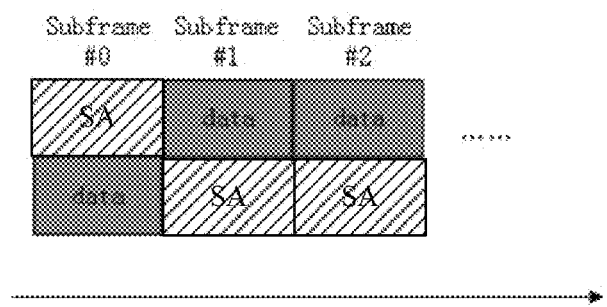
FIG. 3A schematically shows several subframes and the resource pools of the radio signal in the subframes.

FIG. 3A schematically shows several subframes and the resource pools of the radio signal in the subframes.

The conception of a resource pool is defined in 3GPP specifications and it includes time/frequency resources which transmit the same type of channels. Currently in 3GPP Rel.12/13 specifications, SA data resource pool and data resource pool are defined. To extend the usage to V2V, data and SA resource pools could be defined as well in V2V implementations. And as SA and data could be transmitted in the same subframe based on V2V agreements in 3GPP RAN1, SA and data resource pools could be configured in the same subframe as well, as shown in FIG. 3A. UEs at the transmission Mode 1 and Mode 2 will take the same usage of the resources.

In an embodiment, the control channel resource pool may be a resource pool including resources used for transmitting or receiving control channels (carrying control radio signaling), and which could be used to transmit SA, or Sidelink Control Channel (PSCCH). And the data channel resource pool may be a resource pool including resources used for transmitting or receiving user traffic or user data (or user load), and which could also exampled as Physical Sidelink Shared Channel (PSSCH) from 3GPP physical protocol point of view.

Figure 3B:
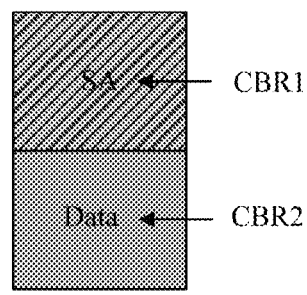
FIG. 3B schematically shows an example for explaining a measuring operation of the wireless communication apparatus according to the embodiment of the present disclosure.

FIG. 3B schematically shows an example for explaining such measuring operation of the wireless communication apparatus according to the embodiment of the present disclosure.

As shown in FIG. 3B, the different types of channel resource pools of the radio signal may include a SA channel resources pool (shown as SA in the drawings), and a data channel resource pool (shown as data in the drawings). The circuitry 202 as shown in FIG. 2 may be operative to measure a first channel busy ratio (CBR1) for the SA channel resource pool and measure a second channel busy ratio (CBR2) for the data channel resource pool respectively and separately.

As such, each CBR for each type of channel resource pool can be measured separately, and a distinctive and unique congestion control can be performed particularly with respect to this type of channel resource pool. Therefore, such congestion control can be more accurate and efficient.

In an embodiment, the first node may be operating at one of different transmission modes, and the circuitry may be operative to measure the channel busy ratios for different types of channel resource pools of the radio signal respectively with respect to the different transmission modes.

In an embodiment, the different transmission modes may include a first transmission mode (for example Mode 1 as defined in 3GPP, in which transmission is based on base station scheduling) and a second transmission mode (for example Mode 2 as defined in 3GPP, which is a user equipment autonomous resource allocation mode). Although two transmission modes are exemplified herein, the number of the transmission modes is not limited to two, but may be other numbers.

Figure 4:
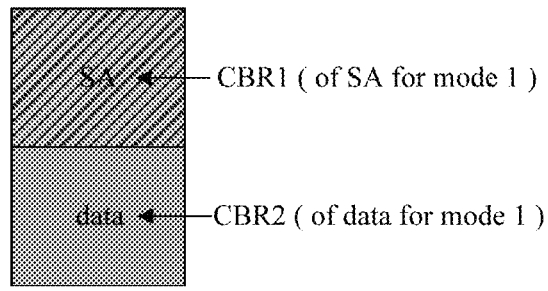
FIG. 4 schematically shows an example for explaining another measuring operation of the wireless communication apparatus according to another embodiment of the present disclosure.
Figure 4:
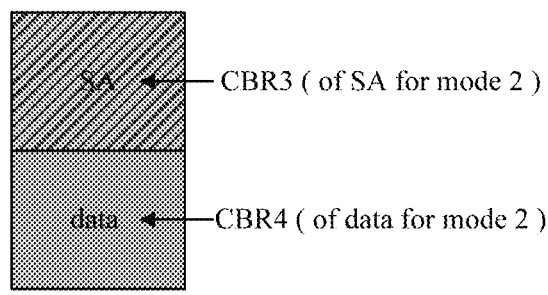

In this case, FIG. 4 schematically shows an example for explaining another measuring operation of the wireless communication apparatus according to another embodiment of the present disclosure.

As shown in FIG. 4, the circuitry may be operative to measure the CBRs for different types of channel resource pools of the radio signal respectively with respect to the different transmission modes, for example, measure a CBR1 for the SA resource pool in Mode 1 resources, and measure a CBR2 for the data resource pool in Mode 1 resources, and measure a CBR3 for the SA resource pool in Mode 2 resources, and measure a CBR4 for the data resource pool in Mode 2 resources.

As such, each CBR for each type of channel resource pool at different transmission modes can be measured separately, and a distinctive and unique congestion control can be performed particularly with respect to this type of channel resource pool at this transmission mode. Therefore, such congestion control can be more accurate and efficient.

Figure 5:
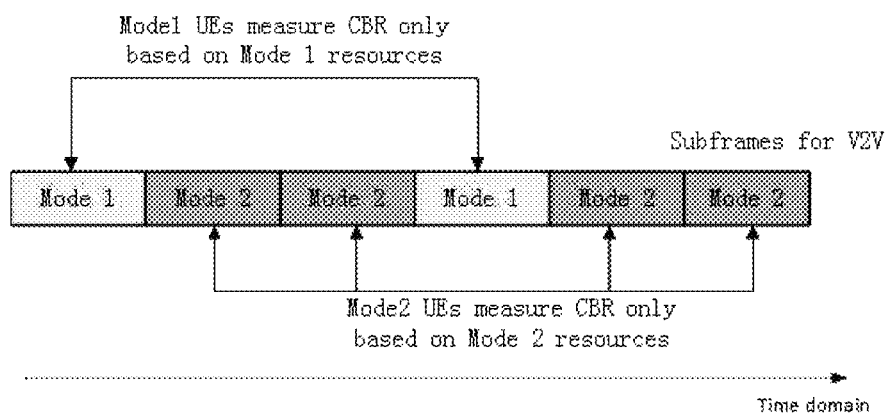
FIG. 5 schematically shows an example for explaining another measuring operation of the wireless communication apparatus according to another embodiment of the present disclosure.

FIG. 5 schematically shows an example for explaining another measuring operation of the wireless communication apparatus according to another embodiment of the present disclosure.

In this embodiment, it is assumed that the different transmission modes include a first transmission mode (for example Mode 1 as defined in 3GPP in which transmission is based on base station scheduling) and a second transmission mode (for example Mode 2 as defined in 3GPP that is a user equipment autonomous resource allocation mode).

In the case that the first node is operating at the first transmission mode, for example Mode 1, the circuitry 202 may be operative to measure the first channel busy ratio, CBR1, for the control channel resource pool for the first transmission mode and measure the second channel busy ratio, CBR2 for the data channel resource pool for the first transmission mode, Mode 1.

As such, UEs at Mode 1 only measure CBRs including the CBR for the control channel resource pool and the CBR for the data channel resource pool resources at Mode 1, without measuring CBRs for the control channel resource pool and the data channel resource pool resources at Mode 2 so as to save power consumption and increase efficiency while maintaining accurate CBR measurement and congestion control.

On the other hand, In the case that the first node is operating at the second transmission mode, for example Mode 2, the circuitry 202 may be operative to measure the third channel busy ratio, CBR3, for the control channel resource pool for the second transmission mode and measure the fourth channel busy ratio, CBR4 for the data channel resource pool for the second transmission mode, Mode 2.

As such, UEs at Mode 2 only measure CBRs including the CBR for the control channel resource pool and the CBR for the data channel resource pool resources at Mode 2, without measuring CBRs for the control channel resource pool and the data channel resource pool resources at Mode 1 so as to save power consumption and increase efficiency while maintaining accurate CBR measurement and congestion control.

Figure 6:
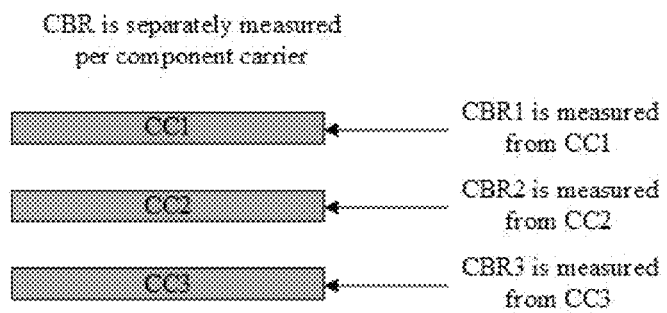
FIG. 6 schematically shows an example for explaining another measuring operation of the wireless communication apparatus according to another embodiment of the present disclosure.

FIG. 6 schematically shows an example for explaining another measuring operation of the wireless communication apparatus according to another embodiment of the present disclosure.

In the embodiment, in the case that the radio signal is of a plurality of carriers in frequency domain, the circuitry 202 may be operative to measure the channel busy ratios for the different types of channel resource pools for each carrier.

As shown in FIG. 6, it is assumed that the radio signal is formed of carrier component 1 (CC1), carrier component 2 (CC2), and carrier component 3 (CC3). The circuitry 202 may be operative to measure a CBR1 including the CBR for the control channel resource pool and the CBR for the data channel resource pool resources with respect to the carrier CC1, and measure a CBR2 including the CBR for the control channel resource pool and the CBR for the data channel resource pool resources with respect to the carrier CC2, and measure a CBR3 including the CBR for the control channel resource pool and the CBR for the data channel resource pool resources with respect to the carrier CC3, respectively.

From above method that CBR is measured per CC, more accurate CBR measurement and congestion control could be obtained, and power consumption can also be saved.

After the CBRs are measured, the measured CBR can be compared to a predetermined threshold to determine a congestion situation. The predetermined threshold could be specified, preconfigured or RRC configured.

In the case that one or more of the channel busy ratios exceed the predetermined threshold, the circuitry 202 may be operative to instruct the transceiver 201 to transmit radio signal not in unoccupied resources in one or more of the different types of channel resource pools corresponding to the one or more of the channel busy ratios. Herein, the one or more of the different types of channel resource pools corresponding to the one or more of the channel busy ratios indicates the channel resource pool whose channel busy ratio exceeds the predetermined threshold, and is also called congested channel resource pool.

Such action of transmitting radio signal not in unoccupied resources includes one or more of: transmitting radio signal in occupied resources for data with a priority lower than a priority of the radio signal to be transmitted; transmitting radio signal in occupied resources by dropping data occupying the occupied resources; transmitting radio signal by adjusting radio parameters for the radio signal; and delaying a predetermined time to transmit radio signal, and other actions for not occupying the occupied resources in the congested resource pool. In an embodiment, the radio parameters for the radio signal may include one or more of power and number of transmissions of a transport block or other parameters. In this case, the priority of the radio signal could be specified or RRC configured.

In the case that one or more of the channel busy ratios do not exceed a predetermined threshold, the circuitry 202 may be operative to instruct the transceiver to transmit radio signal in unoccupied resources in the one or more of the different types of channel resource pools corresponding to the one or more of the channel busy ratios.

To be noted that in the case of the specific examples, Mode 1 and Mode 2 as defined in 3GPP, and in the case that the first node is the UE, since the eNB is in charge of schedule and congestion control when the UE is at Mode 1, after measuring the CBRs for Mode 1 at the UE side and the measurement is reported to the eNB, the eNB is to instruct the UE (including the circuitry 202 at the UE) to (instruct the transceiver to) transmit the radio signal not in unoccupied resources, or transmit the radio signal in unoccupied resources. On the other hand, the UE itself can be in charge of schedule and congestion control when the UE is at Mode 2, so after measuring the CBRs for Mode 2, the UE (including the circuitry 202 at the UE) can instruct the transceiver to transmit the radio signal not in unoccupied resources, or transmit the radio signal in unoccupied resources.

However, which is in charge of schedule and congestion control and which will send the instructions is not a limitation, but in some embodiments, as long as there are different transmission modes, and CBRs for the different the transmission modes are measured respectively, the specific congestion control can be performed on the first node to realize effects including power consumption saving, accurate congestion control and so on, no matter who is in charge of schedule and congestion control.

FIGS. 7A-7D schematically show different congestion control actions for different congestion situations.

The different congestion situations can be divided according to both of the congested situation of the control channel resource pool and the congested situation of the data channel resource pool.

As shown in FIGS. 7A-7D, the term "congested" indicates that the channel busy ratios exceeds (i.e., is larger than or equal to) the predetermined threshold, and the term "not congested" indicates that the channel busy ratios does not exceed (i.e., is less than) the predetermined threshold.

Figure 7A:
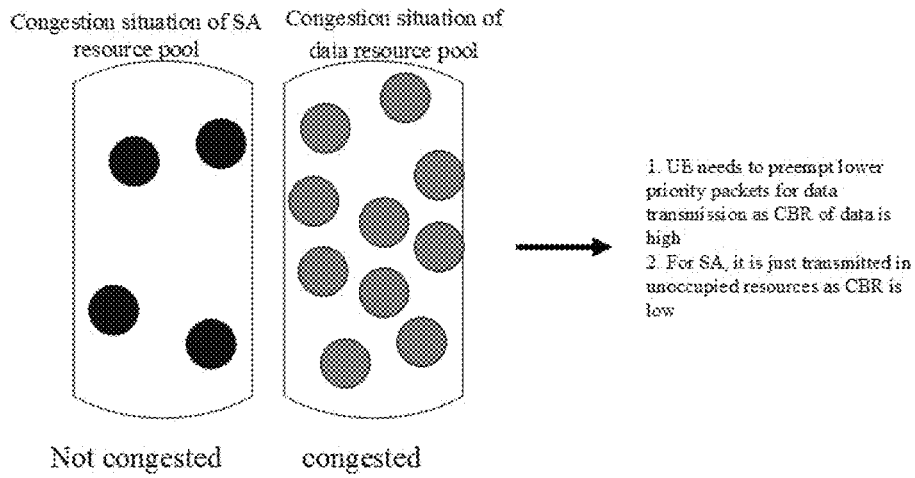
FIGS. 7A-7D schematically show different congestion control actions for different congestion situations.

In FIG. 7A, the SA resource pool is not congested and the data resource pool is congested based on the CBR measurement. Based on the above-mentioned straightforward solution in which that the CBR is measured based on the whole bandwidth without distinctively measuring each CBR for each type of resource pool, the CBR level may be low, so data will be transmitted in unoccupied resources in the data resource pool. However, such behavior will cause heavier congestion situation for data transmission especially in the case that the data channel resource pool is already congested.

Based on the proposal of the embodiments of the present disclosure that CBRs for SA and data are separately measured, it can be clearly known that the SA resource pool is not congested and the data resource pool is congested, even if the whole congestion situation for the whole bandwidth is still not congested. So different actions can be taken for SA and data resource pools by:
1. for the data channel resource pool, preempting lower priority packets for data transmission in the occupied resources in the data channel resource pool as the CBR of data is high and the data channel resource pool is congested. It does not need to transmit the packets in unoccupied resources further; and
2. for the SA channel resource pool, the data can be transmitted in unoccupied resources in the SA channel resource pool as the CBR of SA is low, and the SA channel resource pool is not congested.

By doing so, the SA resource pool's utilization is improved, and congestion situation of the data resource pool does not become worse. Each resource pool's utilization can be optimized to obtain an improved congestion control on each of the whole resource pools.

In this example, preemption means transmitting radio signal in occupied resources for data with a priority lower than a priority of the radio signal to be transmitted, which is mentioned for congestion control. Other possibilities are also possible, including for example, transmitting radio signal in occupied resources by dropping data occupying the occupied resources; transmitting radio signal by adjusting radio parameters for the radio signal; and delaying a predetermined time to transmit radio signal, and others.

Figure 7B:
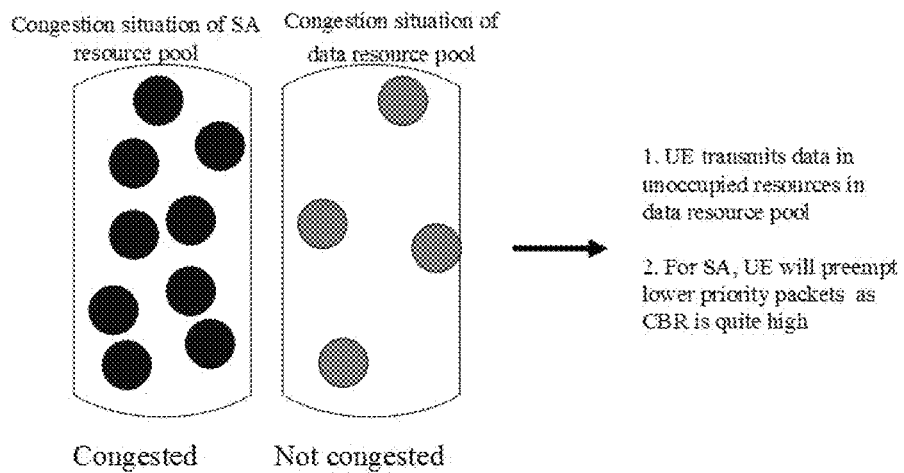

In FIG. 7B, the SA resource pool is congested and the data resource pool is not congested based on the CBR measurement.

Based on the proposal of the embodiments of the present disclosure that CBRs for SA and data are separately measured, it can be clearly known that the SA resource pool is congested and the data resource pool is not congested, even if the whole congestion situation for the whole bandwidth is still not congested. So different actions can be taken for the SA and data resource pools by:
1. for the SA channel resource pool, preempting lower priority packets for data transmission in the occupied resources in the SA channel resource pool as the CBR of SA is high and the SA channel resource pool is congested. It does not need to transmit the packets in unoccupied resources further; and 2. for the data channel resource pool, the data can be transmitted in unoccupied resources in the data channel resource pool as the CBR of data is low, and the data channel resource pool is not congested.

By doing so, the data resource pool's utilization is improved, and congestion situation of the SA resource pool does not become worse. Each resource pool's utilization can be optimized to obtain an improved congestion control on each of the whole resource pools.

Figure 7C:
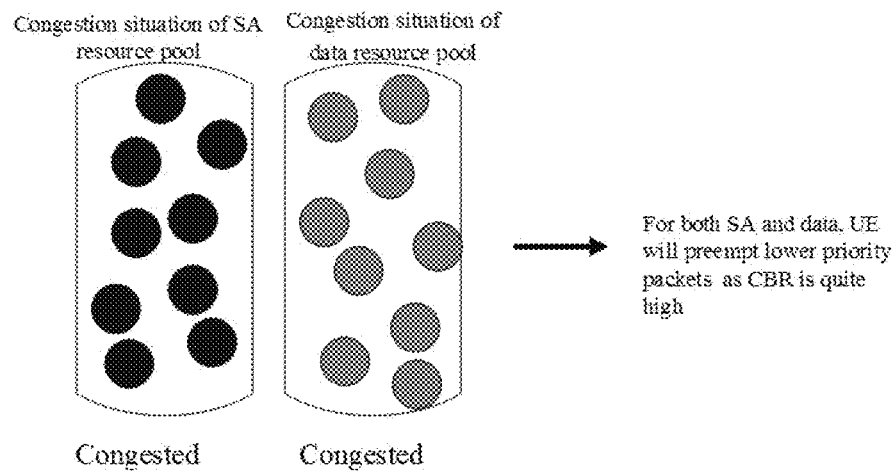

In FIG. 7C, the SA resource pool is congested and the data resource pool is also congested based on the CBR measurement.

Based on the proposal of the embodiments of the present disclosure that CBRs for SA and data are separately measured, it can be clearly known that the SA resource pool is congested and the data resource pool is also congested. So actions can be taken for the SA and data resource pools by:

For both the SA channel resource pool and the data channel resource pool, preempting lower priority packets for data transmission in the occupied resources in both the SA channel resource pool and the data channel resource pool as the CBRs of SA and data are both high.

By doing so, the congestion situation of the SA and data resource pools does not become worse.

Figure 7D:
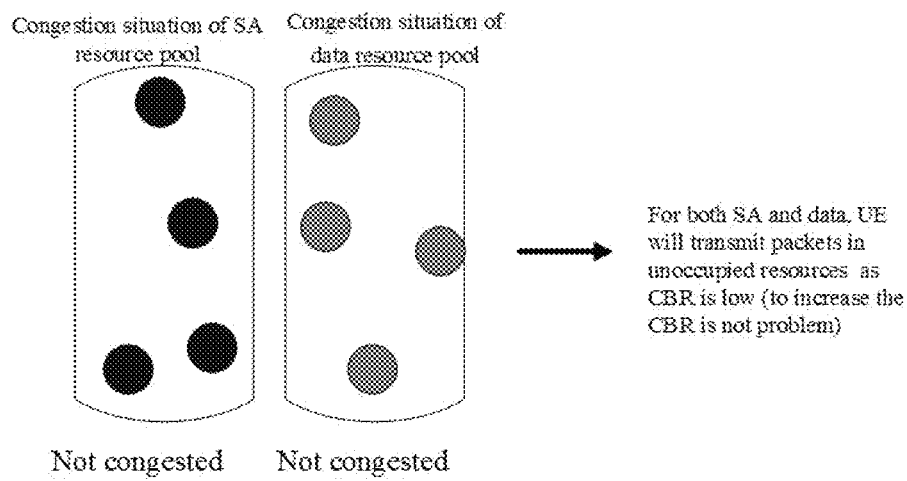

In FIG. 7D, the SA resource pool is not congested and the data resource pool is not congested based on the CBR measurement.

Based on the proposal of the embodiments of the present disclosure that CBRs for SA and data are separately measured, it can be clearly known that the SA resource pool is not congested and the data resource pool is not congested. So actions can be taken for the SA and data resource pools by:

For both the SA and data channel resource pools, the data can be transmitted in unoccupied resources in both the SA and data channel resource pools as the CBRs of SA and data are both low.

By doing so, both the data and SA resource pools' utilization is improved.

Figure 8:
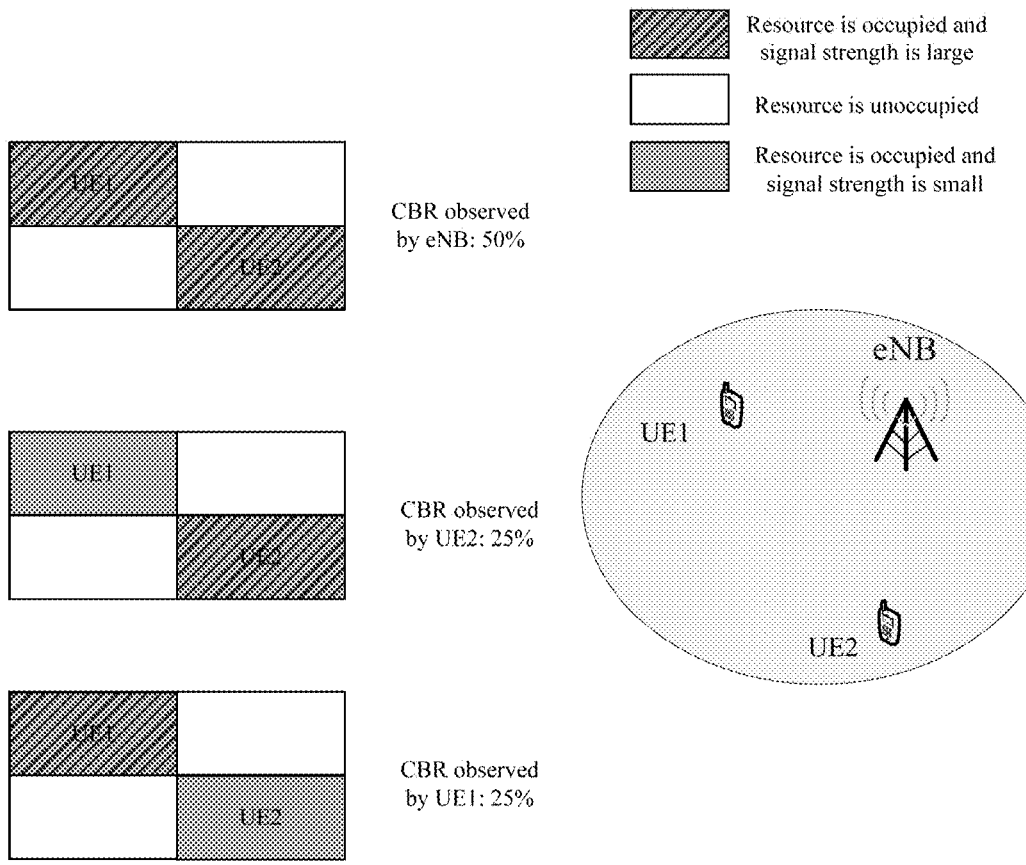
FIG. 8 schematically shows an example for explaining a reporting operation of the wireless communication apparatus according to an embodiment of the present disclosure.

FIG. 8 schematically shows an example for explaining a reporting operation of the wireless communication apparatus according to an embodiment of the present disclosure.

CBR can be measured at the eNB side and the UE does not report it. But the eNB side cannot know interference situation at the UEs, so the observed CBR value at the eNB side may be too conservative, because some occupied resources may still be used for other UEs if there is no interference or small interference to each other due to large distance.

So, as proposed in this embodiment, the transceiver 201 at the first node may be operative to report the measured channel busy ratios to a second node, and the first node may be a user equipment (UE), and the second node may be a base station (eNB). That is, the UE sides measure CBRs, and report them to the eNB side.

As shown in FIG. 8, based on the eNB observation, the CBR is 50% as one resource is allocated for UE1 and another resource is allocated to UE2. But at the UE side, a UE1's transmission does not interfere with a UE2, so the relevant resource (the left upper resource as shown) could still be used for transmission by UE2. Therefore, CBR observed by the UE2 is 25%, which is lower than the observation of the eNB. In this case, the observation at the UE side is more accurate.

The benefit of UEs reporting CBRs to the eNB is that the UEs can observe the CBRs more accurately, so the congestion controls on each type of the channel source pool can be more accurate and efficient.

In an embodiment, the transceiver 201 at UE side may be operative to report the measured channel busy ratios, CBRs, to the eNB in response to one of the following conditions: a predetermined period elapses (i.e., periodically); at least one of the measured channel busy ratios exceeds a predetermined threshold; or the reporting is triggered by the base station, i.e., eNB.

Then, detailed congestion control can be done at eNB side, for example, but not limited to:

1. the eNB could adjust the SA or data resource pools based on the reported CBRs of the SA and data respectively.
2. the eNB could adjust congestion situation by scheduling (e.g, not scheduling certain lower priority packets of certain UEs).

The benefit of eNB performing the detailed congestion control is that the eNB can know better about congestion situation on the whole UEs, compared with congestion control totally relying on eNB implementation. The spectral efficiency can be improved.

Thus, with the embodiments of the present disclosure, each CBR for each type of channel resource pool can be measured separately, and the congestion situation for each type of channel resource pool can be clearly known, and a distinctive and unique congestion control can be performed particularly with respect to this type of channel resource pool. Therefore, such congestion control can be more accurate and efficient.

In another embodiment, the wireless communication apparatus 200 at a first node according to the embodiment of the present disclosure includes a transceiver 201, operative to transmit and/or receive radio signal; a circuitry 202, operative to measure one or more channel busy ratios (CBRs) for channel resource pools of the radio signal, and perform congestion control on the channel resource pools based on the measured one or more channel busy ratios. And the first node may be operating at one of different transmission modes, and the circuitry 202 may be operative to measure the channel busy ratios for the channel resource pools of the radio signal with respect to the different transmission modes.

In this embodiment, each CBR for each transmission mode can be measured separately, and the congestion situation for each transmission mode can be clearly known, and a distinctive and unique congestion control can be performed particularly with respect to UEs at each transmission mode. Therefore, such congestion control can be more accurate and efficient.

In another embodiment, the wireless communication apparatus 200 at a first node according to the embodiment of the present disclosure includes a transceiver 201, operative to transmit and/or receive radio signal; a circuitry 202, operative to measure one or more channel busy ratios (CBRs) for channel resource pools of the radio signal, and perform congestion control on the channel resource pools based on the measured one or more channel busy ratios. And in the case that the radio signal is of a plurality of carriers, the circuitry 202 may be operative to measure the channel busy ratios for the channel resource pools for each carrier.

In this embodiment, each CBR for each carrier can be measured separately, and the congestion situation for each carrier can be clearly known, and a distinctive and unique congestion control can be performed particularly with respect to each carrier. Therefore, such congestion control can be more accurate and efficient.

Figure 9A:
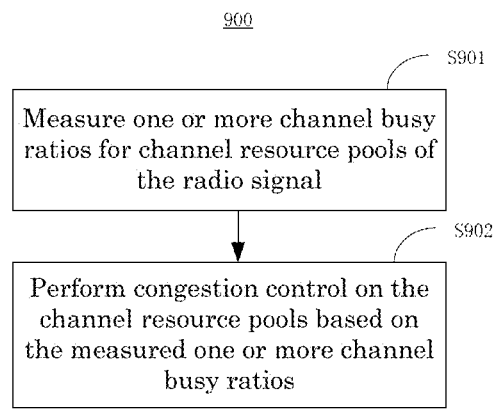
FIG. 9A schematically shows a flow chart of a wireless communication method according to an embodiment of the present disclosure.

FIG. 9A schematically shows a flow chart of a wireless communication method 900 according to an embodiment of the present disclosure.

The method 900, at a first node, comprises: step S901, measuring channel busy ratios for different types of channel resource pool of the radio signal respectively; and step S902 performing congestion control on the different types of channel resource pools based on the measured channel busy ratios.

Thus, each CBR for each type of channel resource pool can be measured separately, and the congestion situation for each type of channel resource pool can be clearly known, and a distinctive and unique congestion control can be performed particularly with respect to this type of channel resource pool. Therefore, such congestion control can be more accurate and efficient.

In an embodiment, the different types of channel resource pools of the radio signal may include a control channel resource pool and a data channel resource pool, and the step S901 may include measuring a first channel busy ratio for the control channel resource pool and measuring a second channel busy ratio for the data channel resource pool.

In an embodiment, the first node may be operating at one of different transmission modes, and the step S901 may include measuring the channel busy ratios for different types of channel resource pools of the radio signal respectively with respect to the different transmission modes.

In an embodiment, the different transmission modes may include a first transmission mode in which transmission is based on base station scheduling and a second transmission mode that is a user equipment autonomous resource allocation mode. In the case that the first node is operating at the first transmission mode, the step S901 may include measuring the first channel busy ratio for the control channel resource pool for the first transmission mode and measuring the second channel busy ratio for the data channel resource pool for the first transmission mode.

In an embodiment, the different transmission modes may include a first transmission mode and a second transmission mode. In the case that the first node is operating at the second transmission mode, the step S901 may include measuring the first channel busy ratio for the control channel resource pool for the second transmission mode and measuring the second channel busy ratio for the data channel resource pool for the second transmission mode.

In an embodiment, in the case that the radio signal is of a plurality of carriers, the step S901 may include measuring the channel busy ratios for the different types of channel resource pools for each carrier.

In an embodiment, in the case that one or more of the channel busy ratios exceed a predetermined threshold, the step S902 may include transmitting radio signal not in unoccupied resources in one or more of the different types of channel resource pools corresponding to the one or more of the channel busy ratios.

In an embodiment, in the case that one or more of the channel busy ratios exceed a predetermined threshold, the step S902 may include one or more of: transmitting radio signal in occupied resources for data with a priority lower than a priority of the radio signal to be transmitted; transmitting radio signal in occupied resources by dropping data occupying the occupied resources; transmitting radio signal by adjusting radio parameters for the radio signal; and delaying a predetermined time to transmit radio signal.

In an embodiment, the radio parameters for the radio signal may include one or more of power and number of transmissions of a transport block.

In an embodiment, in the case that one or more of the channel busy ratios do not exceed a predetermined threshold, the step S902 may include transmitting radio signal in unoccupied resources in the one or more of the different types of channel resource pools corresponding to the one or more of the channel busy ratios.

In an embodiment, the method 900 may further include a step of reporting the measured channel busy ratios to a second node, wherein the first node is a user equipment, and the second node is a base station.

In an embodiment, the step of reporting may include reporting the measured channel busy ratios to a second node in response to one of the following conditions: a predetermined period elapses; at least one of the measured channel busy ratios exceeds a predetermined threshold; or the reporting is triggered by the base station.

In an embodiment, the step 902 may include measuring channel busy ratios (CBRs) by calculating a ratio of occupied number of resources to a total number of resources, wherein, the occupied number of resources indicates a number of calculation units of radio signal which have powers larger than a threshold, and the total number of resources indicates a total number of the calculation units of radio signal.

In an embodiment, the calculation units of radio signal may include one or more physical resource blocks, or one or more resource block groups, and wherein the powers include radio signal power strength, or power spectrum density.

In an embodiment, the control channel resource pool may include a Physical Sidelink Control Channel (PSCCH) resource pool, and the data channel resource pool may include a Physical Sidelink Shared Channel (PSSCH) resource pool.

Thus, with the embodiments of the present disclosure, each CBR for each type of channel resource pool can be measured separately, and the congestion situation for each type of channel resource pool can be clearly known, and a distinctive and unique congestion control can be performed particularly with respect to this type of channel resource pool. Therefore, such congestion control can be more accurate and efficient.

Figure 9B:
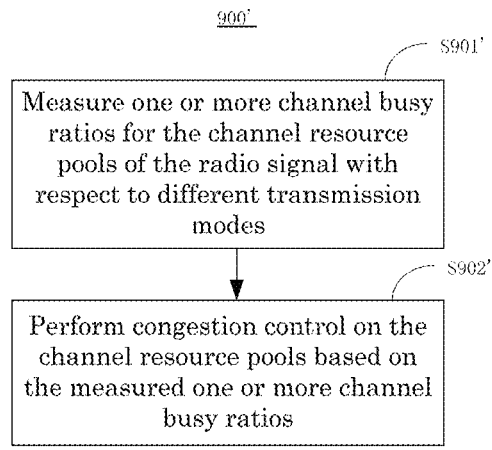
FIG. 9B schematically shows a flow chart of a wireless communication method according to another embodiment of the present disclosure.

FIG. 9B schematically shows a flow chart of a wireless communication method 900' according to another embodiment of the present disclosure.

The method 900', at a first node, comprises: step S901', measuring one or more channel busy ratios for channel resource pools of the radio signal with respect to different transmission modes; and step S902' performing congestion control on the different types of channel resource pool based on the measured channel busy ratios.

In this embodiment, each CBR for each transmission mode can be measured separately, and the congestion situation for each transmission mode can be clearly known, and a distinctive and unique congestion control can be performed particularly with respect to UEs at each transmission mode. Therefore, such congestion control can be more accurate and efficient.

Figure 9C:
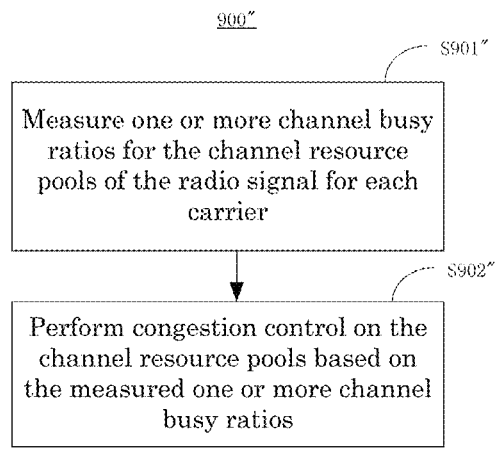
FIG. 9C schematically shows a flow chart of a wireless communication method according to another embodiment of the present disclosure.

FIG. 9C schematically shows a flow chart of a wireless communication method 900" according to another embodiment of the present disclosure.

The method 900", at a first node, comprises: step S901", measuring one or more channel busy ratios for channel resource pools of the radio signal with respect to different transmission modes; and step S902" performing congestion control on the different types of channel resource pool based on the measured channel busy ratios.

In this embodiment, each CBR for each carrier can be measured separately, and the congestion situation for each carrier can be clearly known, and a distinctive and unique congestion control can be performed particularly with respect to each carrier. Therefore, such congestion control can be more accurate and efficient.

Figure 10:
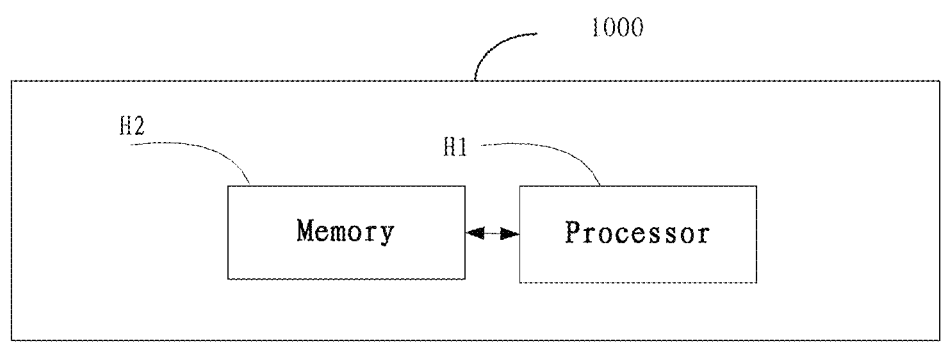
FIG. 10 schematically shows a block diagram of a wireless communication system according to an embodiment of the present disclosure.

FIG. 10 schematically shows a block diagram of a wireless communication system 1000 according to an embodiment of the present disclosure.

The system 1000, at a first node, comprises: a processor H1; a memory H2 coupled with the processor, when executed by the processor, to perform a method 900 including: step S901, measuring channel busy ratios for different types of channel resource pools of the radio signal respectively; and step S902, performing congestion control on the different types of channel resource pools based on the measured channel busy ratios.

In an embodiment, the different types of channel resource pools of the radio signal may include a control channel resource pool and a data channel resource pool, and the step S901 may include measuring a first channel busy ratio for the control channel resource pool and measuring a second channel busy ratio for the data channel resource pool.

In an embodiment, the first node may be operating at one of different transmission modes, and the step S901 may include measuring the channel busy ratios for different types of channel resource pools of the radio signal respectively with respect to the different transmission modes.

In an embodiment, the different transmission modes may include a first transmission mode in which transmission is based on base station scheduling and a second transmission mode that is a user equipment autonomous resource allocation mode. In the case that the first node is operating at the first transmission mode, the step S901 may include measuring the first channel busy ratio for the control channel resource pool for the first transmission mode and measuring the second channel busy ratio for the data channel resource pool for the first transmission mode.

In an embodiment, the different transmission modes may include a first transmission mode and a second transmission mode. In the case that the first node is operating at the second transmission mode, the step S901 may include measuring the first channel busy ratio for the control channel resource pool for the second transmission mode and measuring the second channel busy ratio for the data channel resource pool for the second transmission mode.

In an embodiment, in the case that the radio signal is of a plurality of carriers, the step S901 may include measuring the channel busy ratios for the different types of channel resource pools for each carrier.

In an embodiment, in the case that one or more of the channel busy ratios exceed a predetermined threshold, the step S902 may include transmitting radio signal not in unoccupied resources in one or more of the different types of channel resource pools corresponding to the one or more of the channel busy ratios.

In an embodiment, in the case that one or more of the channel busy ratios exceed a predetermined threshold, the step S902 may include one or more of: transmitting radio signal in occupied resources for data with a priority lower than a priority of the radio signal to be transmitted; transmitting radio signal in occupied resources by dropping data occupying the occupied resources; transmitting radio signal by adjusting radio parameters for the radio signal; and delaying a predetermined time to transmit radio signal.

In an embodiment, the radio parameters for the radio signal may include one or more of power and number of transmissions of a transport block.

In an embodiment, in the case that one or more of the channel busy ratios do not exceed a predetermined threshold, the step S902 may include transmitting radio signal in unoccupied resources in the one or more of the different types of channel resource pools corresponding to the one or more of the channel busy ratios.

In an embodiment, the method 900 may further include a step of reporting the measured channel busy ratios to a second node, wherein the first node is a user equipment, and the second node is a base station.

In an embodiment, the step of reporting may include reporting the measured channel busy ratios to a second node in response to one of the following conditions: a predetermined period elapses; at least one of the measured channel busy ratios exceeds a predetermined threshold; or the reporting is triggered by the base station.

In an embodiment, the step 902 may include measuring channel busy ratios (CBRs) by calculating a ratio of occupied number of resources to a total number of resources, wherein, the occupied number of resources indicates a number of calculation units of radio signal which have powers larger than a threshold, and the total number of resources indicates a total number of the calculation units of radio signal.

In an embodiment, the calculation units of radio signal may include one or more physical resource blocks, or one or more resource block groups, and wherein the powers include radio signal power strength, or power spectrum density.

In an embodiment, the control channel resource pool may include a Physical Sidelink Control Channel (PSCCH) resource pool, and the data channel resource pool may include a Physical Sidelink Shared Channel (PSSCH) resource pool.

Thus, with the embodiments of the present disclosure, each CBR for each type of channel resource pool can be measured separately, and the congestion situation for each type of channel resource pool can be clearly known, and a distinctive and unique congestion control can be performed particularly with respect to this type of channel resource pool. Therefore, such congestion control can be more accurate and efficient.

In addition, embodiments of the present disclosure can at least provide the following subject matters.

(1). An apparatus, at a first node, comprising:
a transceiver, operative to transmit and/or receive radio signal;
a circuitry, operative to measure one or more channel busy ratios for channel resource pools of the radio signal, and perform congestion control on the channel resource pools based on the measured one or more channel busy ratios.

(2) The apparatus according to (1), wherein, a circuitry is operative to measure channel busy ratios for different types of channel resource pools of the radio signal respectively, and perform congestion control on the different types of channel resource pools based on the measured channel busy ratios.

(3). The apparatus according to (3), wherein, the different types of channel resource pools of the radio signal include a control channel resource pool and a data channel resource pool, and wherein the circuitry is operative to measure a first channel busy ratio for the control channel resource pool and measure a second channel busy ratio for the data channel resource pool.

(4). The apparatus according to (2), wherein, the first node is operating at one of different transmission modes, and the circuitry is operative to measure the channel busy ratios for different types of channel resource pools of the radio signal respectively with respect to the different transmission modes.

(5). The apparatus according to (4), wherein, the different transmission modes include a first transmission mode in which transmission is based on base station scheduling and a second transmission mode that is a user equipment autonomous resource allocation mode, wherein in the case that the first node is operating at the first transmission mode, the circuitry is operative to measure the first channel busy ratio for the control channel resource pool for the first transmission mode and measure the second channel busy ratio for the data channel resource pool for the first transmission mode.

(6). The apparatus according to (4), wherein, the different transmission modes include a first transmission mode and a second transmission mode, in the case that the first node is operating at the second transmission mode, the circuitry is operative to measure the first channel busy ratio for the control channel resource pool for the second transmission mode and measure the second channel busy ratio for the data channel resource pool for the second transmission mode.

(7). The apparatus according to (2), wherein, in the case that the radio signal is of a plurality of carriers, the circuitry is operative to measure the channel busy ratios for the different types of channel resource pools for each carrier.

(8). The apparatus according to (2), wherein, in the case that one or more of the channel busy ratios exceed a predetermined threshold, the radio signal is not transmitted in unoccupied resources in one or more of the different types of channel resource pools corresponding to the one or more of the channel busy ratios.

(9). The apparatus according to (8), wherein, the circuitry is operative to instruct the transceiver to perform one or more of:

transmitting radio signal in occupied resources for data with a priority lower than a priority of the radio signal to be transmitted;

transmitting radio signal in occupied resources by dropping data occupying the occupied resources;

transmitting radio signal by adjusting radio parameters for the radio signal; and delaying a predetermined time to transmit radio signal.

(10). The apparatus according to (9), wherein, the radio parameters for the radio signal include one or more of power and number of transmissions of a transport block.

(11). The apparatus according to (2), wherein, in the case that one or more of the channel busy ratios do not exceed a predetermined threshold, the radio signal is transmitted in unoccupied resources in the one or more of the different types of channel resource pools corresponding to the one or more of the channel busy ratios.

(12). The apparatus according to (2), wherein, the transceiver is operative to report the measured channel busy ratios to a second node, wherein the first node is a user equipment, and the second node is a base station.

(13). The apparatus according to (12), wherein, the transceiver is operative to report the measured channel busy ratios to the second node in response to one of the following conditions:

a predetermined period elapses;

at least one of the measured channel busy ratios exceeds a predetermined threshold; or the reporting is triggered by the base station.

(14). The apparatus according to (2), wherein, a circuitry, operative to measure channel busy ratios (CBRs) by calculating a ratio of occupied number of resources to a total number of resources, wherein, the occupied number of resources indicates a number of calculation units of radio signal which have powers larger than a threshold, and the total number of resources indicates a total number of the calculation units of radio signal.

(15). The apparatus according to (14), wherein, the calculation units of radio signal include one or more physical resource blocks, or one or more resource block groups, and wherein the powers include radio signal power strength, or power spectrum density.

(16). The apparatus according to (3), wherein the control channel resource pool includes a Physical Sidelink Control Channel (PSCCH) resource pool, and the data channel resource pool includes a Physical Sidelink Shared Channel (PSSCH) resource pool.

(17). The apparatus according to claim 1, wherein the first node is operating at one of different transmission modes, and the circuitry is operative to measure the channel busy ratios for the channel resource pools of the radio signal with respect to the different transmission modes.

(18). The apparatus according to claim 1, wherein in the case that the radio signal is of a plurality of carriers, the circuitry is operative to measure the channel busy ratios for the channel resource pools for each carrier.

(19). A method, at a first node, operative to transmit and/or receive radio signal, the method comprising:

measuring one or more channel busy ratios for channel resource pools of the radio signal, and performing congestion control on the channel resource pools based on the measured one or more channel busy ratios.

(20). The method according to (19), wherein, the different types of channel resource pool of the radio signal include a control channel resource pool and a data channel resource pool, and wherein the measuring includes measuring a first channel busy ratio for the control channel resource pool and measuring a second channel busy ratio for the data channel resource pool.

(21). The method according to (19), wherein, the first node is operating at one of different transmission modes, and the measuring includes measuring the channel busy ratios for different types of channel resource pools of the radio signal respectively with respect to the different transmission modes.

(22). The method according to (21), wherein, the different transmission modes include a first transmission mode in which transmission is based on base station scheduling and a second transmission mode that is a user equipment autonomous resource allocation mode, wherein in the case that the first node is operating at the first transmission mode, the measuring includes measuring the first channel busy ratio for the control channel resource pool for the first transmission mode and measuring the second channel busy ratio for the data channel resource pool for the first transmission mode.
(23). The method according to (21), wherein, the different transmission modes include a first transmission mode and a second transmission mode,
in the case that the first node is operating at the second transmission mode, the measuring includes measuring the first channel busy ratio for the control channel resource pool for the second transmission mode and measuring the second channel busy ratio for the data channel resource pool for the second transmission mode.
(24). The method according to (19), wherein, in the case that the radio signal is of a plurality of carriers, the measuring includes measuring the channel busy ratios for the different types of channel resource pools for each carrier.
(25). The method according to (19), wherein, in the case that one or more of the channel busy ratios exceed a predetermined threshold, the performing includes transmitting radio signal not in unoccupied resources in one or more of the different types of channel resource pools corresponding to the one or more of the channel busy ratios.
(26). The method according to (25), wherein, the performing includes one or more of:
transmitting radio signal in occupied resources for data with a priority lower than a priority of the radio signal to be transmitted;
transmitting radio signal in occupied resources by dropping data occupying the occupied resources;
transmitting radio signal by adjusting radio parameters for the radio signal; and
delaying a predetermined time to transmit radio signal.
(27). The method according to (25), wherein, the radio parameters for the radio signal include one or more of power and number of transmissions of a transport block.
(28). The method according to (19), wherein, in the case that one or more of the channel busy ratios do not exceed a predetermined threshold, the performing includes transmitting radio signal in unoccupied resources in the one or more of the different types of channel resource pools corresponding to the one or more of the channel busy ratios.
(29). The method according to (19), wherein, the method further comprises reporting the measured channel busy ratios to a second node, wherein the first node is a user equipment, and the second node is a base station.
(30). The method according to (29), wherein, the method further comprises reporting the measured channel busy ratios to the second node in response to one of the following conditions:
a predetermined period elapses;
at least one of the measured channel busy ratios exceeds a predetermined threshold; or
the reporting is triggered by the base station.
(31). The method according to (19), wherein, the measuring includes measuring channel busy ratios (CBRs) by calculating a ratio of occupied number of resources to a total number of resources,
wherein, the occupied number of resources indicates a number of calculation units of radio signal which have powers larger than a threshold, and the total number of resources indicates a total number of the calculation units of radio signal.
(32). The method according to (31), wherein, the calculation units of radio signal include one or more physical resource blocks, or one or more resource block groups, and wherein the powers include radio signal power strength, or power spectrum density.
(33). The method according to (20), wherein the control channel resource pool includes a Physical Sidelink Control Channel (PSCCH) resource pool, and a data channel resource pool includes a Physical Sidelink Shared Channel (PSSCH) resource pool.
(34). The method according to (19), wherein the first node is operating at one of different transmission modes, and the measuring includes measure the channel busy ratios for the channel resource pools of the radio signal with respect to different transmission modes.
(35). The method according to (19), wherein in the case that the radio signal is of a plurality of carriers, the measuring includes measuring the channel busy ratios for the channel resource pools for each carrier.
(36). A system, at a first node, comprising:
a processor;
a memory coupled with the processor, when executed by the processor, to perform a method including:
measuring channel busy ratios for different types of channel resource pools of the radio signal respectively, and
performing congestion control on the different types of channel resource pools based on the measured channel busy ratios.
(37). The system according to (36), wherein, the different types of channel resource pool of the radio signal include a control channel resource pool and a data channel resource pool, and
wherein the measuring includes measuring a first channel busy ratio for the control channel resource pool and measuring a second channel busy ratio for the data channel resource pool.
(38). The system according to (36), wherein, the first node is operating at one of different transmission modes, and the measuring includes measuring the channel busy ratios for different types of channel resource pools of the radio signal respectively with respect to different transmission modes.
(39). The system according to (38), wherein, the different transmission modes include a first transmission mode and a second transmission mode,
wherein in the case that the first node is operating at the first transmission mode, the measuring includes measuring the first channel busy ratio for the control channel resource pool for the first transmission mode and measuring the second channel busy ratio for the data channel resource pool for the first transmission mode.
(40). The system according to (38), wherein, the different transmission modes include a first transmission mode and a second transmission mode,
wherein the measuring includes measuring the first channel busy ratio for the control channel resource pool for the second transmission mode and measuring the second channel busy ratio for the data channel resource pool for the second transmission mode.
(41). The system according to (36), wherein, in the case that the radio signal is of a plurality of carriers, the measuring includes measuring the channel busy ratios for the different types of channel resource pools for each carrier.

(42). The system according to (36), wherein, in the case that one or more of the channel busy ratios exceed a predetermined threshold, the performing includes transmitting radio signal not in unoccupied resources in one or more of the different types of channel resource pools corresponding to the one or more of the channel busy ratios.

(43). The system according to (42), wherein, the performing includes one or more of:
transmitting radio signal in occupied resources for data with a priority lower than a priority of the radio signal to be transmitted;
transmitting radio signal in occupied resources by dropping data occupying the occupied resources;
transmitting radio signal by adjusting radio parameters for the radio signal; and delaying a predetermined time to transmit radio signal.

(44). The system according to (43), wherein, the radio parameters for the radio signal include one or more of power and number of transmissions of a transport block.

(45). The system according to (36), wherein, in the case that one or more of the channel busy ratios do not exceed a predetermined threshold, the performing includes transmitting radio signal in unoccupied resources in the one or more of the different types of channel resource pools corresponding to the one or more of the channel busy ratios.

(46). The system according to (36), wherein, the method further comprises reporting the measured channel busy ratios to a second node, wherein the first node is a user equipment, and the second node is a base station.

(47). The system according to (46), wherein, the method further comprises reporting the measured channel busy ratios to the second node in response to one of the following conditions:
a predetermined period elapses;
at least one of the measured channel busy ratios exceeds a predetermined threshold; or
the reporting is triggered by the base station.

(48). The system according to (36), wherein, the measuring includes measuring channel busy ratios (CBRs) by calculating a ratio of occupied number of resources to a total number of resources,
wherein, the occupied number of resources indicates a number of calculation units of radio signal which have powers larger than a threshold, and the total number of resources indicates a total number of the calculation units of radio signal.

(49). The system according to (48), wherein, the calculation units of radio signal include one or more physical resource blocks, or one or more resource block groups, and wherein the powers include radio signal power strength, or power spectrum density.

(50). The system according to (37), wherein the control channel resource pool includes a Physical Sidelink Control Channel (PSCCH) resource pool, and the data channel resource pool includes a Physical Sidelink Shared Channel (PSSCH) resource pool.

(51). The method according to (36), wherein the first node is operating at one of different transmission modes, and the measuring includes measure the channel busy ratios for the channel resource pools of the radio signal with respect to different transmission modes.

(52). The method according to (36), wherein in the case that the radio signal is of a plurality of carriers, the measuring includes measuring the channel busy ratios for the channel resource pools for each carrier.

The present disclosure can be realized by software, hardware, or software in cooperation with hardware. Each functional block used in the description of each embodiment described above can be realized by an LSI as an integrated circuit, and each process described in the each embodiment may be controlled by LSI. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

Examples of several embodiments of the present disclosure have been described in detail above, with reference to the attached illustrations of specific embodiments. Because it is not possible, of course, to describe every conceivable combination of components or techniques, those skilled in the art will appreciate that various modifications may be made to the above described embodiments without departing from the scope of the present disclosure. For example, it will be readily appreciated that although the above embodiments are described with reference to parts of a 3GPP network, an embodiment of the present disclosure will also be applicable to like networks, such as a successor of the 3GPP network, having like functional components.

Therefore, in particular, the terms 3GPP and associated or related terms used in the above description and in the enclosed drawings and any appended claims now or in the future are to be interpreted accordingly.

The present disclosure can be realized by software, hardware, or software in cooperation with hardware. Each functional block used in the description of each embodiment described above can be realized by an LSI as an integrated circuit, and each process described in the each embodiment may be controlled by LSI. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

Notably, modifications and other embodiments of the disclosed disclosure(s) will come to mind to one skilled in the art having the benefit of the teachings presented in the foregoing descriptions and the associated drawings. Therefore, it is to be understood that the disclosure(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A first communication apparatus that is a user equipment, the first communication apparatus comprising:
   circuitry, which in operation, measures one or more channel busy ratios for one or more resource pools; and
   a transmitter, which in operation, transmits a radio signal to a second communication apparatus by adjusting radio parameters of at least a power and a number of transmissions of a transport block based on the one or more channel busy ratios and a priority of the radio signal associated with the one or more channel busy ratios,
   wherein, the one or more channel busy ratios include one or more channel busy ratios relating to a data channel and one or more channel busy ratios relating to a control channel, and
   wherein each of the one or more channel busy ratios corresponding to each carrier is separately measured, and a different congestion control is applied with respect to each of the carriers, respectively.

2. The first communication apparatus according to claim 1, wherein the one or more channel busy ratios include one or more channel busy ratios relating to a PSSCH and one or more channel busy ratios relating to a PSCCH.

3. The first communication apparatus according to claim 2, wherein each of the one or more channel busy ratios is calculated on a plurality of Physical Resource Blocks (PRBs).

4. The first communication apparatus according to claim 1, wherein the one or more channel busy ratios include one or more channel busy ratios relating to a first type of a channel resource pool and one or more channel busy ratios relating to a second type of a channel resource pool.

5. The first communication apparatus according to claim 1, wherein the one or more channel busy ratios include one or more channel busy ratios relating to a first transmission mode in which a base station schedules resources.

6. The first communication apparatus according to claim 5, wherein the one or more channel busy ratios include one or more channel busy ratios relating to a second transmission mode in which the first communication apparatus autonomously schedules resources.

7. The first communication apparatus according to claim 1, wherein the transmitter, in operation, reports the measured one or more channel busy ratios to a base station.

8. The first communication apparatus according to claim 7, wherein the report of the measured one or more channel busy ratios is triggered by an event.

9. The first communication apparatus according to claim 7, wherein the measured one or more channel busy ratios is reported periodically.

10. The first communication apparatus according to claim 1, wherein each of the one or more channel busy ratios indicates a ratio of a number of resources which exceeds a threshold to a total number of resources.

11. A communication method performed by a first communication apparatus that is a user equipment comprising:
    measuring one or more channel busy ratios for one or more resource pools; and
    transmitting a radio signal to a second communication apparatus by adjusting radio parameters of at least a power and a number of transmissions of a transport block based on the one or more channel busy ratios and a priority of the radio signal associated with the one or more channel busy ratios,
    wherein, the one or more channel busy ratios include one or more channel busy ratios relating to a data channel and one or more channel busy ratio relating to a control channel, and
    wherein each of the one or more channel busy ratios corresponding to each carrier is separately measured, and a different congestion control is applied with respect to each of the carriers, respectively.

* * * * *